Figure 1:
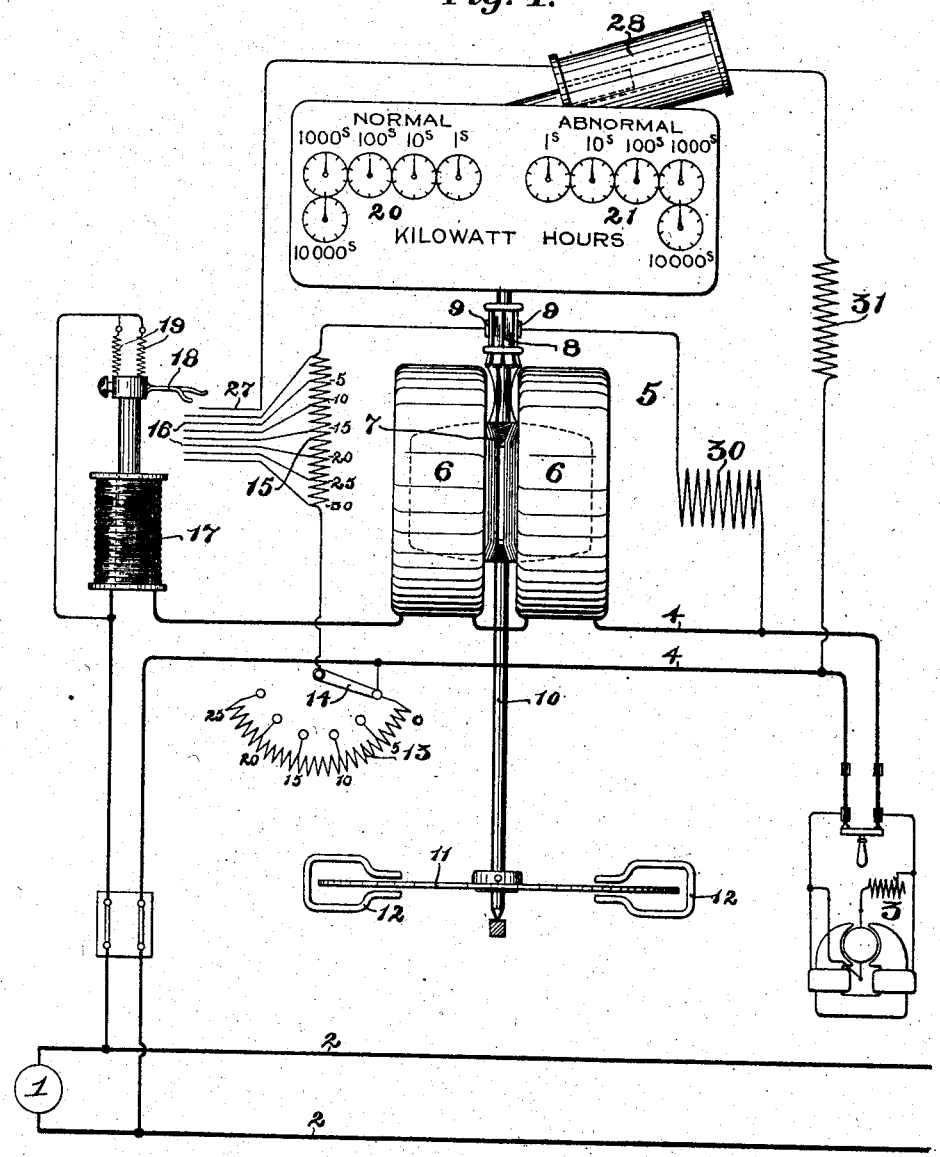

No. 796,036. PATENTED AUG. 1, 1905.
T. DUNCAN.
ELECTRIC METER.
APPLICATION FILED JULY 3, 1901.

2 SHEETS—SHEET 1.

WITNESSES: INVENTOR.
THOMAS DUNCAN
BY Charles A. Brown Cragg & Belfield
ATTORNEYS.

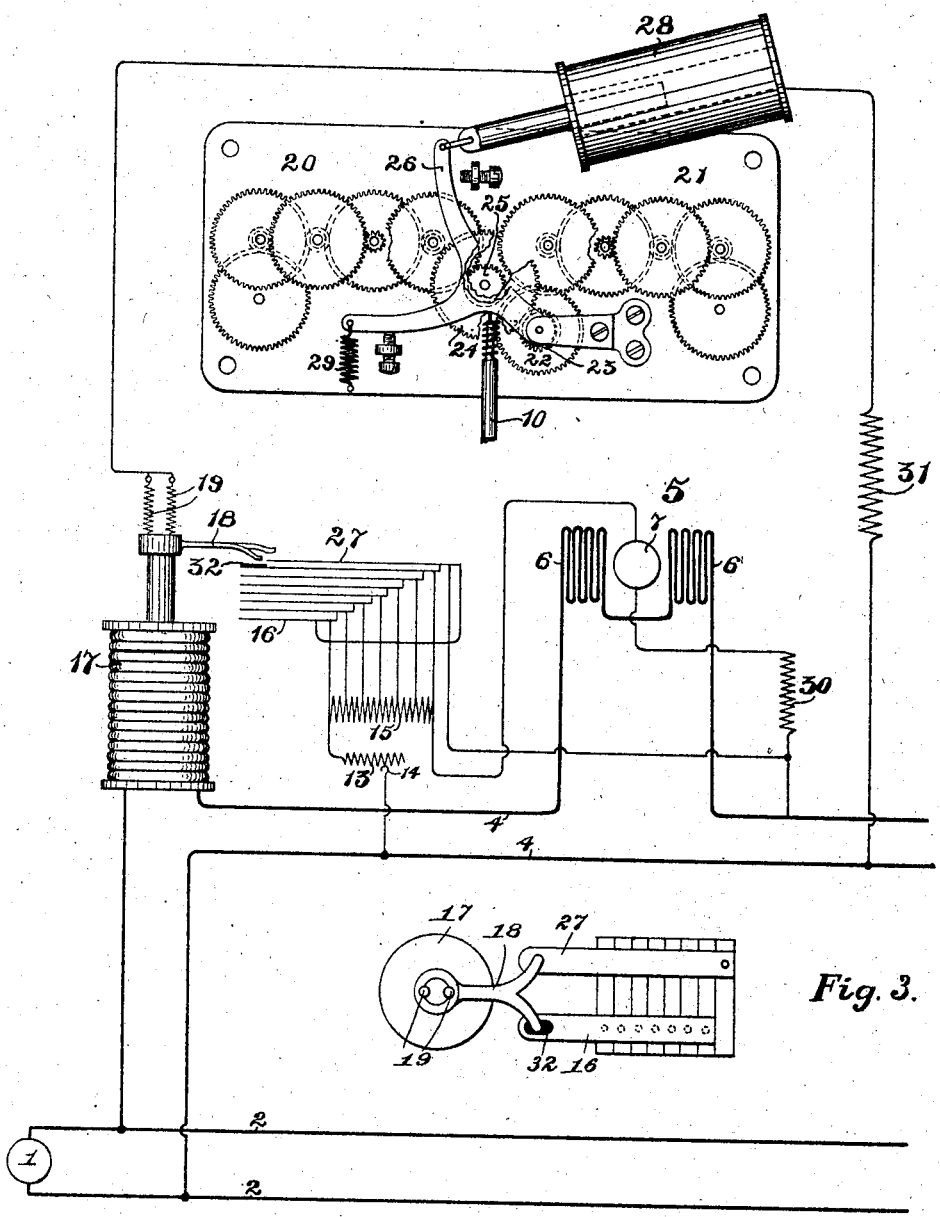

UNITED STATES PATENT OFFICE.

THOMAS DUNCAN, OF CHICAGO, ILLINOIS.

ELECTRIC METER.

No. 796,036.  Specification of Letters Patent.  Patented Aug. 1, 1905.

Application filed July 3, 1901. Serial No. 66,954.

*To all whom it may concern:*

Be it known that I, THOMAS DUNCAN, a citizen of the United States, residing at Chicago, in the county of Cook and State of Illinois, have invented a certain new and useful Improvement in Electric Meters, of which the following is a full, clear, concise, and exact description, reference being had to the accompanying drawings, forming a part of this specification.

My invention relates to electric meters for measuring the power in systems of electrical distribution, and has as its salient features, first, the provision of step-by-step adjusting means, whereby the rate of operation of the meter for a given load may be varied, whereby the meter may be caused to totalize at a rate according to the price agreed upon with the consumer, the meter thus constituting a prediscount meter; second, the provision of automatically-operated means for governing the rate of operation of the meter, whereby the meter may be caused to operate at different rates of speed according to the load, whereby the consumer may be charged at an increased rate for current that is intermittently consumed above a normal maximum, this automatically-operated means preferably including a graded or step-by-step device for effecting a step-by-step increase in the torque of the meter—that is, as the excess in load increases the normal torque is correspondingly increased to produce a rate of registration per unit of energy or load of the meter that is greater than that which would exist if the current being measured were within normal limits; third, means whereby the consumer may be informed of the current consumed in excess of the normal maximum, and means also for determining the amount of current consumed within the normal limits.

Various consumers may be allowed different rates of discount—that is, the meters when provided with scales indicating kilowatt-hours or other measuring units may be caused to register different amounts for a given quantity of current, which is a way of affording consumers their respective discounts. I am enabled by means of my invention to have the operation of the meter adjusted in a manner to have the meter indicate that which the consumer is to be charged for. The reading-scale may, if desired, be marked to indicate the kilowatt-hours, the adjusting means being provided to produce an operation of the the counting-train of the instrument that need not necessarily indicate the exact energy or load, but the quantity of energy or load that the consumer is to be charged for, the reading indicating the total actual power consumed less the prearranged discount. For example, the meters may be equipped with step-by-step adjusting devices providing for five, ten, fifteen, twenty, and twenty-five per cent. discount. One consumer may not be given any discount. His meter will then indicate the true reading in kilowatt-hours of the energy consumed. Another consumer may be given five per cent. discount. Supposing that he has consumed one thousand kilowatt-hours, his instrument will indicate a charge for nine hundred and fifty kilowatt-hours. Another consumer, who uses ten thousand or more kilowatt-hours, may be given ten per cent. discount, and for the ten thousand kilowatt-hours consumed his meter will indicate a charge for nine thousand kilowatt-hours. By this arrangement the keeping of accounts is greatly simplified, as the consumers are charged according to the readings of their meters, each instrument then taking cognizance of the particular consumer's discount. In the preferred embodiment of my invention I practice this feature thereof by adjusting the torque of the instrument, which may be done by including, where the commutated motor-meter is employed, a step-by-step resistance in series with the armature, the greater the discount the greater the resistance included in circuit with the armature to produce a lesser torque for a given load and a correspondingly slower operation of the counting mechanism.

That feature of my invention which relates to the automatic change in the rate of speed of the meter for loads in excess of normal maximum is of particular utility where motors are frequently stopped and started—as, for example, when such motors are employed in hoisting. As the starting of motors necessarily requires increased amounts of current, especially where induction-motors are employed, larger units are necessary at the generating or central station when such motors are frequently stopped and started than would be required if the motors ran continuously after once being started. On this account the cost of installing and maintaining the generating apparatus has been greater heretofore for that service where the motors are frequently stopped and started in proportion to the amount of money returned than in other systems of translating devices to which energy is supplied.

By means of my invention the meter may register a definite percentage of increased charge above the normal maximum that is exceeded whenever the motors are started, supposing, for example, that a motor requires a normal maximum of one hundred amperes. In starting or under sudden fluctuation of the load this normal load may be exceeded. When this excess occurs, automatic means are brought into operation for increasing the torque of the meter to cause the same to register at an increased rate per unit of energy or load. If the excess of current should be still further increased beyond a predetermined point, the torque may be still further increased beyond that torque that would merely record the actual power consumed. There may be a business arrangement, for example, whereby the consumer's meter has its rate of registration increased five per cent. for an increase in the current of five per cent. over the normal maximum, has its rate of registration increased ten per cent. for an increase in the current of seven and one-half per cent. over the normal maximum or has its rate of registration increased fifteen per cent for an increase in the current of ten per cent. over the normal maximum, &c. In order that the producer and consumer may know what extra demands have been placed upon the system, two reading-scales are preferably provided in combination with automatic means, which means engages the normal counting-train with the rotating element of the meter when the current is within normal limits and connects the remaining or abnormal counting-train with the rotating element of the meter when the current is in excess of the normal maximum. This means may indicate to the consumer the relative efficiency of motors in his service. In practicing these features of my invention a solenoid is preferably included in the working circuit, which solenoid may serve when the current passing therethrough is increased above the normal maximum, as upon the sudden starting of a motor, to close circuit through another solenoid that thereupon disconnects the normal measuring mechanism from the rotating element of the meter and connects this rotating element with the abnormal measuring mechanism. A definite amount of resistance is at the same time cut out from a series connection in the armature-circuit by a switch controlled by the solenoid to increase the torque a corresponding percentage in excess of the normal torque.

I will explain my invention more fully by reference to the accompanying drawings, in which—

Figure 1 illustrates a system of direct-current distribution, the meter being diagrammatically indicated in elevation. Fig. 2 is also a view of a system of direct-current distribution, the counting-train being illustrated in detail, the dial-plate being removed. Fig. 3 is a plan view of the excess-rate switch and the solenoid governing the same.

Like parts are indicated by similar characters of reference throughout the figures.

I have illustrated a system of direct-current distribution and a commutated motor-meter; but the invention is equally applicable to other systems of electrical distribution and to meters of other forms.

In Figs. 1 and 2 the generator 1 supplies current to the transmission-mains 2 2. These mains convey current to translating devices, such as motors, a motor 3, of well-known type, being illustrated in Fig. 1, this motor being connected in circuit with supply-conductors 4 4. A meter 5 is associated with the consumer's supply-circuit 4 4, the meter in this instance employing a field-winding divided into coils 6 6 in series with one of the conductors 4, and an armature 7 in bridge between the mains 4 4, a commutator 8 with brushes 9 9 being provided for including the armature in circuit. The armature is mounted upon a shaft 10, at the lower part of which is a damping-disk 11, arranged within the fields of the permanent magnets 12 12 to secure requisite damping effect.

In order to adjust the torque of the meter to conform to the prearranged cost of the current, I preferably include a resistance 13, that may be termed a "discount" resistance, in series with the armature, this resistance being provided with a plurality of discount-buttons that may be suitably marked to indicate various discounts. A switch-arm 14 may be swung into engagement with any of the buttons to include more or less of the resistance 13 in circuit with the armature. If the consumer is to pay at the highest rate, the circuit conditions may be such that none of the resistance 13 should be included in circuit with the armature, whereby the greatest torque may exist between the armature and field. If the consumer is to receive five per cent. discount, a certain section of the resistance may be included in circuit by swinging the rheostat-arm 14 to the button marked "5." If the consumer is to receive ten per cent. discount, the arm 14 may be swung to the button "10." Thus the torque of the meter may be readily adjusted to cause the meter to indicate a quantity of energy for which a fixed rate may be charged, the indicated quantity of energy being the same as the actual quantity consumed where no discount is allowed and less than the actual energy consumed according to the percentage of discount.

The meter is also provided with a torque-adjusting resistance 15, divided into sections having terminal-contacts 16. This resistance is designed to be altogether included, preferably, in series with the armature during the presence of normal current in the system. As the current in the system is increased beyond the normal maximum this resistance 15 is cut out of circuit step by step as the excess current increases correspondingly, whereby the torque between the armature and field of the meter is increased step by step to cause a corresponding rate of increase of the normal torque of the meter. The means that I preferably employ for accomplishing this result comprises a solenoid or electromagnet 17, that is included in series with the translating means 3, the core of the solenoid being provided with an arm 18, that forces the spring-terminals 16 together as the core of the solenoid is drawn into the helix thereof, the attraction of the helix of the solenoid for its core increasing as the abnormal current within the distribution-circuit increases. For example, if the meter 5 is designed to operate normally when the current remains within the normal maximum of one hundred amperes and if the current exceeds this value by five per cent. the core of the solenoid will be drawn sufficiently within its helix to bring the two upper resistance-terminals 16 into contact, thereby cutting out the first section of the resistance 15 and causing an increase of five per cent. in the normal torque of the meter, whereby the rate of registration per unit of energy is increased. If the current in the distribution-circuit should increase seven and one-half per cent. above this normal, then the three upper resistance-terminals 16 are brought into contact upon a further attraction of the solenoid-core, whereby the two upper sections of the resistance 15 are short-circuited and an increase of ten per cent. in the normal torque of the meter effected. Thus the sections of the resistance 15 are successively cut out or shunted out of circuit as the current increases above the maximum, thereby increasing the strength of the armature-field and the torque of the meter. The core of the solenoid is preferably adjusted by means of springs 19 to prevent the same from being drawn within the solenoid-helix while normal current only is present upon the line.

I prefer to record the excess rate upon a different counting mechanism, and on this account I provide each meter with two counting-trains 20 and 21, the counting-train 20 constituting the normal counting-train, while the counting-train 21 constitutes the abnormal counting-train. A registering-wheel 22 is permanently geared to the upper end of the meter-shaft, a pinion 23 being fixed with relation to the gear 22. The pinion 23 is in constant engagement with a gear 24, to which gear is rigidly secured a pinion 25. The wheels 24 and 25 are mounted upon a shaft that is rotatably secured within a rotating frame 26, the frame being rotatable about an axis coincident with an axis of the wheels 22 and 23, whereby the wheel 24 is maintained in engagement with the wheel 23 irrespective of the rotary adjustment of the frame. The pinion 25 in the alternative position illustrated in Fig. 2 serves to actuate the counting-train 20, which condition exists when the current in the distribution-circuit is normal. When the current is abnormal, by means of mechanism to be hereinafter set forth, the frame 26 is rotated in a clockwise direction to effect an engagement between the pinion 25 and the counting-train 21, this pinion 25 at the same time being disengaged from the normal counting-train 20, so that during the presence of abnormal current in the distribution-circuit the counting-train 21 will alone be actuated. The means that I prefer to employ for accomplishing this interchange of operative association between the counting-trains 20 and 21 with the shaft 10 comprise the same solenoid 17 with its arm 18, a switch-strip 27 constituting one terminal of a circuit, including the solenoid or electromagnet 28, the other terminal of this circuit comprising the arm 18, the energizing-circuit being preferably in bridge of the mains 4 4. When an abnormal current is upon the line, the circuit including the solenoid 28 is closed and the core of this solenoid is drawn within the helix thereof, and the core by being attached to the swinging frame 26 thereupon causes a clockwise rotation of the frame to effect an engagement between the pinion 25 and the counting-train 21. When there is no longer abnormal current in the working circuit, the helix of the solenoid 17 is sufficiently deënergized to permit the springs 19 to withdraw the solenoid-core, whereupon the circuit including the solenoid 28 is opened, so that the spring 29 may rotate the frame 26 in a contra-clockwise direction to reëngage the pinion 25 with the normal counting-train 20.

Extraneous resistances 30 and 31 may be included in circuit, respectively, with the armature and the solenoid helix 28 to reduce the current consumed by these elements.

It will be seen that I have provided at the district of consumption a meter having thereat a torque-modifying resistance in series with one of its windings, which in direct current or commutated meters is the armature-winding. This torque-modifying resistance by being in bridge in the mains obviates the employment of a special conductor extending from the generating-station to the district of distribution as has hitherto been proposed.

A block of insulating material 32 may be provided upon the uppermost terminal spring 16 to avoid electrical connection between the circuits, including the solenoid 28 and the armature.

In Fig. 3 I have shown an enlarged detail view of the solenoid 17 and its arm 18 and the spring-contacts 27 and 16 actuated thereby. The solenoid 17 and the element 18 actuated thereby constitute a unitary electromagnetic means for modifying the speed-varying resistance 27, said resistance and said unitary electromagnetic means constituting a unitary means for regulating the rate of speed of the meter per unit of load or energy.

The prediscount resistance shown in this application forms subject-matter of my application Serial No. 67,814, filed July 11, 1901.

While I have herein shown and particularly described the preferred embodiment of my invention, it is obvious that changes may be readily made without departing from the spirit thereof, and I do not, therefore, wish to be limited to the precise disclosure herein set forth; but,

Having thus described my invention, I claim as new and desire to secure by Letters Patent—

1. The combination with a system of electrical distribution, of a meter having current and pressure windings receiving current therefrom, a graduated resistance, and unitary electromagnetic means operated by the current in the working circuit for including more or less of the resistance-sections in circuit with a winding of the meter to vary the torque thereof to change the rate of operation of the measuring element of the meter per unit of energy or load, substantially as described.

2. The combination with a system of electrical distribution, of a meter receiving current therefrom, unitary automatically-operated step-by-step adjusting means for changing step by step the rate of operation of the measuring element of the meter per unit of energy or load, and means whereby the aforesaid means are prevented from operating until a predetermined normal maximum of current in the working circuit has been passed, substantially as described.

3. The combination with a system of electrical distribution, of a meter receiving current therefrom, unitary electromagnetic means governed by the current in the system and serving to automatically step by step change the rate of operation of the measuring element of the meter per unit of energy or load, and means whereby the aforesaid means are prevented from operating until a predetermined normal maximum of current in the working circuit has been passed, substantially as described.

4. The combination with a system of electrical distribution, of a meter having current and pressure windings receiving current therefrom, a resistance, unitary electromagnetic means operated by the current in the working circuit for including step by step more or less of the resistance in circuit with a winding of the meter to vary the torque thereof to change the rate of operation of the measuring element of the meter per unit of energy or load, and means whereby the aforesaid means are prevented from operating until a predetermined normal maximum of current in the working circuit has been passed, substantially as described.

5. The combination with a system of electrical distribution, of a meter having current and pressure windings receiving current therefrom, a resistance, and unitary electromagnetic means operated by the current in the working circuit for including step by step more or less of the resistance in circuit with a winding of the meter to vary the torque thereof to change the rate of operation of the measuring element of the meter per unit of energy or load, the said resistance being in circuit with the pressure-winding, substantially as described.

6. The combination with a system of electrical distribution, of a meter having current and pressure windings receiving current therefrom, a resistance, unitary electromagnetic means operated by the current in the working circuit for including step by step more or less of the resistance in circuit with a winding of the meter to vary the torque thereof to change the rate of operation of the measuring element of the meter per unit of energy or load, the said resistance being in circuit with the pressure-winding, and means whereby the aforesaid means are prevented from operating until a predetermined normal maximum of current in the working circuit has been passed, substantially as described.

7. The combination with a system of electrical distribution, of a meter receiving current therefrom having two counting-trains, a rocking frame for connecting one or the other of the counting-trains with the rotating element of the meter, an electromagnet for swinging the rocking frame, a solenoid or magnet governed by the current in the system for closing circuit through the aforesaid magnet to rotate the frame and bring the rotating element of the meter out of engagement with one counting-train and into engagement with the other, and means whereby the said solenoid is prevented from operating until the current of the system has reached a predetermined normal maximum, substantially as described.

8. The combination with a system of electrical distribution, of a measuring instrument receiving current therefrom, a prediscount-adjusting rheostat in series with a meter-winding, a second speed-adjusting rheostat in series with the said discount-rheostat and said meter-winding, a solenoid or electromagnet 17 receiving current from the system, the latter rheostat having terminals, the said electromagnet being provided with means for connecting the said terminals to successively short-circuit sections of the corresponding rheostat, whereby the torque of the instrument is increased as the current increases to increase the rate of registration of the meter per unit of energy or load, and means for preventing the said electromagnet from operating until the current in the system has passed a predetermined normal maximum, substantially as described.

9. The combination with a system of electrical distribution, of a measuring instrument receiving current therefrom, a speed-adjusting rheostat in series with a winding of the meter, a solenoid or electromagnet 17 receiving current from the system, the said rheostat having terminals, the said electromagnet being provided with means for connecting the said terminals to successively short-circuit the sections of the rheostat, whereby the torque of the instrument is increased as the current increases to increase the rate of registration of the meter per unit of energy or load, and means for preventing the said electromagnet from operating until the current in the system has passed a predetermined normal maximum, substantially as described.

10. The combination with a system of electrical distribution, of a measuring instrument having field and armature windings receiving current therefrom, a speed-adjusting rheostat in series with the armature-winding, a solenoid or electromagnet 17 receiving current from the system, the said rheostat having terminals, the said electromagnet being provided with means for connecting the said terminals to successively short-circuit the sections of the rheostat, whereby the torque of the instrument is increased as the current increases to increase the rate of registration of the meter per unit of energy or load, and means for preventing the said electromagnet from operating until the current in the system has passed a predetermined normal maximum, substantially as described.

11. The combination with a system of electrical distribution, of a meter receiving current therefrom, said meter being provided with two counting-trains, one to register the load on the system when the current is within normal limits, and the other to register the load on the system when the current exceeds the normal maximum, a swinging frame provided with gearing for engagement with one or the other of the counting-trains, an electromagnet 28 in engagement with the swinging frame, means for engaging the gearing upon the swinging frame with the rotating element of the meter, a switch for closing circuit through the magnet 28 and magnet 17 for operating the said switch to close the said circuit when the current exceeds the normal maximum to rotate the frame 26 to effect engagement between the rotating element of the meter and the abnormal counting-train, and means whereby the said frame is rotated in an opposite direction to engage the rotating element of the meter with the normal counting-train when the magnet 28 is deënergized, substantially as described.

12. The combination with a system of electrical distribution, of a meter receiving current therefrom, said meter being provided with two counting-trains, one to register the load on the system when the current is within normal limits, and the other to register the load on the system when the current exceeds the normal maximum, a swinging frame provided with gearing for engagement with one or the other of the counting-trains, an electromagnet 28 in engagement with the swinging frame, means for engaging the gearing upon the swinging frame with the rotating element of the meter, and means whereby the said electromagnet may be operated upon an increase in current above the normal maximum, to connect the rotating element of the meter with the abnormal counting-train, substantially as described.

13. The combination with a system of electrical distribution, of an energy-meter having two relatively stationary sets of counting-trains, shifting gearing for connecting the rotating element of the meter with one or the other of the said sets to operate the same, and means governed by the current in the system, for operating the aforesaid gearing to bring one or the other of the said counting-trains into operative engagement with the rotating element of the meter, substantially as described.

14. The combination with a system of electrical distribution, of a wattmeter located at the district of consumption, a torque-modifying adjusting resistance in circuit with the pressure-winding of the wattmeter included in a conductor located at the district of consumption, and unitary electromagnetic mechanism in the working circuit for controlling step by step the operation of the adjusting resistance, substantially as described.

15. The combination with a system of electrical distribution, of a wattmeter located at the district of consumption, a torque-modifying adjusting resistance at the district of consumption for the pressure-winding of the meter, a bridge-conductor between the distribution-mains and located at the district of consumption for supplying the said pressure-winding and resistance with current, which current may be thus modified by said resistance, and unitary electromagnetic mechanism in the working circuit for controlling step by step the operation of the adjusting resistance, substantially as described.

16. The combination with a system of electrical distribution, of a commutated wattmeter located at the district of consumption, the pressure-winding of the meter constituting the armature of the meter, a torque-modifying adjusting resistance at the district of consumption for the pressure-winding of the meter, and a bridge-conductor between the distribution-mains and located at the district of consumption for supplying the said pressure-winding and resistance with current which current may be thus modified by said resistance, and unitary electromagnetic mechanism in the working circuit for controlling step by step the operation of the adjusting resistance, substantially as described.

17. The combination with a system of electrical distribution, of a wattmeter located at the district of consumption, a torque-modifying adjusting resistance in circuit with the pressure-winding of the wattmeter included in a conductor located at the district of consumption, and unitary electromagnetic mechanism subject to the current of the system for governing the adjusting resistance step by step, substantially as described.

18. The combination with a system of electrical distribution, of a wattmeter located at the district of consumption, a torque-modifying adjusting resistance at the district of consumption for the pressure-winding of the meter, a bridge-conductor between the distribution-mains and located at the district of consumption for supplying the said pressure-winding and resistance with current which current may be thus modified by said resistance, and unitary electromagnetic mechanism subject to the current of the system governing the torque-modifying resistance step by step, substantially as described.

19. The combination with a system of electrical distribution, of a commutated wattmeter located at the district of consumption, the pressure-winding of the meter constituting the armature of the meter, a torque-modifying adjusting resistance at the district of consumption for the pressure-winding of the meter, a bridge-conductor between the distribution-mains and located at the district of consumption for supplying the said pressure-winding and resistance with current which current may be thus modified by said resistance, and unitary electromagnetic mechanism subject to the current of the system governing the torque-modifying resistance step by step, substantially as described.

In witness whereof I hereunto subscribe my name this 23d day of May, A. D. 1901.

THOMAS DUNCAN.

Witnesses:
GEORGE L. CRAGG,
HERBERT F. OBERGFELL,